US006372074B1

United States Patent
Holguin et al.

(10) Patent No.: US 6,372,074 B1
(45) Date of Patent: Apr. 16, 2002

(54) METHOD OF FORMING A PROTECTIVE COATING FOR COLOR FILTERS

(75) Inventors: Daniel L. Holguin, Fullerton; Eng-Pi Chang, Arcadia, both of CA (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 09/594,229

(22) Filed: Jun. 14, 2000

(51) Int. Cl.$^7$ .............................. B32B 31/28; G02B 5/22
(52) U.S. Cl. .................... 156/234; 156/247; 156/275.3; 156/275.5; 156/275.7; 156/330; 156/331.4; 156/331.7; 156/332; 349/106; 359/891; 430/7
(58) Field of Search ................................. 156/230, 234, 156/247, 275.3, 275.5, 275.7, 289, 330, 331.4, 331.7, 332; 349/106, 108; 359/891; 430/7, 20; 522/95, 182, 173; 526/264; 523/176

(56) References Cited

U.S. PATENT DOCUMENTS

| | | | |
|---|---|---|---|
| 4,092,374 A | 5/1978 | Douek et al. ............... 260/873 |
| 4,640,727 A | 3/1987 | Janssen ....................... 156/240 |
| 4,812,541 A | * 3/1989 | Mallya et al. ............... 526/264 |
| 4,846,556 A | 7/1989 | Haneda ....................... 350/317 |
| 5,045,418 A | 9/1991 | Fukuyoshi ..................... 430/7 |
| 5,232,634 A | 8/1993 | Sawada et al. .............. 252/584 |
| 5,326,605 A | * 7/1994 | Ono et al. ................... 428/41.2 |
| 5,725,976 A | 3/1998 | Nakano et al. ................. 430/7 |
| 5,804,301 A | 9/1998 | Curatolo ..................... 428/352 |
| 5,897,727 A | * 4/1999 | Staral et al. .............. 156/275.5 |
| 5,993,588 A | 11/1999 | Nakamura ................... 156/212 |

FOREIGN PATENT DOCUMENTS

EP        0 977 085 A1     2/2000

OTHER PUBLICATIONS

E.P. Chang; "Viscoelastic Windows of Pressure–Sensitive Adhesives"; *J. Adhesion*; 1991, vol. 34, pp. 189–200.

* cited by examiner

*Primary Examiner*—Michael A. Tolin
(74) *Attorney, Agent, or Firm*—Renner, Otto, Boisselle & Sklar, LLP

(57) ABSTRACT

There is provided an adhesive article including (a) a radiation curable adhesive layer comprising an acrylic pressure sensitive adhesive and, optionally, an acrylated urethane polymer; and (b) a transparent carrier layer. The adhesive article may contain a radiation curable epoxy layer between the radiation curable adhesive layer and the transparent carrier layer. This adhesive article is particularly useful in preparing protective coatings on color filters for use in a liquid-crystal display panel structure. The radiation curable epoxy layer and radiation curable pressure sensitive adhesive are applied to the color filter and then exposed to UV radiation. The UV radiation exposure transforms the pressure sensitive adhesive from a removable adhesive to a permanent adhesive. The color filter with the UV cured adhesive layer is then baked to fully cure the adhesive layer and to transform the adhesive further into a near structural adhesive. The cured adhesive layer, and cured epoxy layer, if present, make up the protective coating for the color filter.

11 Claims, 3 Drawing Sheets

METHOD OF FORMING A PROTECTIVE COATING FOR COLOR FILTERS

TECHNICAL FIELD

This invention relates to a protective coating for a color filter used in a full color liquid crystal display device or the like and the method of manufacturing such protective coating.

BACKGROUND OF THE INVENTION

Full color liquid-crystal displays have become very common, in recent years, as flat panel displays. They generally have a structure comprising: a color filter, a counter electrode substrate facing the color filter, and a liquid-crystal layer provided in a gap between the color filter and the counter electrode substrate. The structure of the color filter is arranged so that a colored layer of a black matrix and a plurality of colors (generally three primary colors, red (R), green (G) and blue (B)) is provided on a transparent substrate and a protective layer and a transparent electrode are stacked thereon in that order. These color liquid-crystal displays are constructed so that a color image is obtained by controlling the light transmission of the liquid-crystal layer in its portions corresponding to pixels of respective colored layers R, G and B.

In the color filter, the protective layer functions to protect and flatten the colored layer. In general, color liquid-crystal displays have a problem that the presence of an uneven gap attributable to the waviness of the surface of the transparent substrate in the color filter, an uneven gap among R, G and B pixels, or an uneven gap within pixels of R, G and B lowers the flatness of the transparent electrode. This causes uneven colors and uneven contrast, leading to lowered image quality. In particular, in color liquid crystal displays of super-twisted nematic (STN) system, the flatness greatly affects the image quality. This renders flattening by the protective layer very important.

In use, the color filter is adhered to the counter electrode. The assembly is then tested for display quality. In consideration of the reusability of the color filter when the assembly is judged to be unacceptable in the display quality test, the protective layer is preferably provided only in specific regions so as to cover the colored layers on the transparent substrate. To this end, the protective layer has been formed using a photocurable resin that permits portions to be cured to be easily limited through a mask.

In the formation of the protective layer using the conventional resin, an organic solvent has been used in the development after exposure of the radiation curable protective coating material to UV radiation. This is troublesome in handleability and wastewater treatment and further lacks in profitability and stability. European Patent Application Publication No. 977,085 describes a photocurable resin designed to solve this problem. A photocurable resin is described which, by virtue of the introduction of an acidic group into the photocurable resin, permits alkali development after exposure. The photocurable resin composition comprises: a copolymer resin; a bifunctional or higher polyfunctional photopolymerizable acrylate monomer; an epoxy resin and an initiator.

SUMMARY OF THE INVENTION

This invention relates to a curable adhesive article comprising a curable pressure sensitive adhesive layer coated on a transparent carrier film. The adhesive article is useful in forming a protective coating on a color filter. The adhesive article may be a tape or a label and may also include a curable epoxy layer between the curable pressure sensitive adhesive layer and the transparent carrier film. In another embodiment, a radiation curable pressure sensitive adhesive layer is a removable adhesive that may be used to position a radiation curable epoxy layer on a color filter. The radiation curable epoxy layer and radiation curable pressure sensitive adhesive are exposed to radiation through a mask positioned over the colored layers of the color filter. The radiation exposure transforms the pressure sensitive adhesive from a removable adhesive to a permanent adhesive. The uncured epoxy layer portions and the uncured adhesive portions are removed with the removal of the carrier film. The remaining multilayer structure is then baked to fully cure the epoxy layer and to transform the adhesive further into a near structural adhesive. In one embodiment, the fully cured epoxy and adhesive layers together make up the protective coating for the color filter. In another embodiment, the fully cured adhesive layer itself makes up the protective coating for the color filter.

The adhesive article of the present invention comprises: (a) a radiation curable adhesive layer having an upper surface and a lower surface, the adhesive layer comprising an acrylic pressure sensitive adhesive and optionally, an acrylated urethane oligomer; and (b) a transparent carrier layer, having an upper surface and a lower surface, wherein the lower surface of the transparent carrier layer overlies the upper surface of the adhesive.

The adhesive article of the present invention may also comprise: (a) a radiation curable adhesive layer having an upper surface and a lower surface, the adhesive layer comprising an acrylic pressure sensitive adhesive and an acrylated urethane oligomer; (b) a radiation curable epoxy layer having an upper surface and a lower surface; and (c) a transparent carrier layer, having an upper surface and a lower surface, wherein the lower surface of the transparent carrier layer overlies the upper surface of the epoxy layer and wherein the lower surface of the epoxy layer overlies the upper surface of the adhesive layer.

The method of manufacturing the protective coating on a color film of the present invention comprises the steps of: (1) adhering an adhesive article to the color layer of a color filter, wherein the adhesive article comprises (a) a curable adhesive layer having an upper surface and a lower surface, the adhesive layer comprising a crosslinkable acrylic pressure sensitive adhesive; and (b) a transparent carrier layer, having an upper surface and a lower surface, wherein the lower surface of the transparent carrier layer overlies the upper surface of the adhesive; so that the lower surface of the adhesive layer is adhered to the upper surface of the colored layer; (2) curing the adhesive layer of the adhesive article; (3) removing the carrier layer to form a multilayer structure comprising a transparent substrate, a colored layer and a protective coating overlying the colored layer, wherein the protective coating comprises the cured adhesive layer.

The method of manufacturing the protective coating of the present invention may also comprise the steps of: (1) adhering an adhesive article to the color layer of a color filter, wherein the adhesive article comprises (a) a radiation curable adhesive layer having an upper surface and a lower surface, the adhesive layer comprising an acrylic pressure sensitive adhesive and an acrylated urethane oligomer; (b) a radiation curable epoxy layer having an upper surface and a lower surface; and (c) a transparent carrier layer, having an upper surface and a lower surface, wherein the lower surface of the transparent carrier layer overlies the upper surface of the epoxy layer and wherein the lower surface of the epoxy layer overlies the upper surface of the adhesive layer; so that the lower surface of the adhesive layer is adhered to the upper surface of the colored layer; (2) positioning a photomask over the adhesive article; (3) exposing the adhesive article to radiation through the photomask to cure portions of the adhesive layer and the epoxy layer of said multilayer tape and leaving portions of the adhesive layer and epoxy layer uncured; (4) removing the carrier layer and the uncured portions of the adhesive layer and epoxy layer to form a multilayer structure comprising a transparent substrate, a colored layer and a protective coating overlying the colored layer, wherein the protective coating comprises the radiation cured portions of the adhesive layer and the epoxy layer; and (5) baking the multilayer structure to fully cure the protective coating.

DETAILED DESCRIPTION OF THE INVENTION

Figure 1:
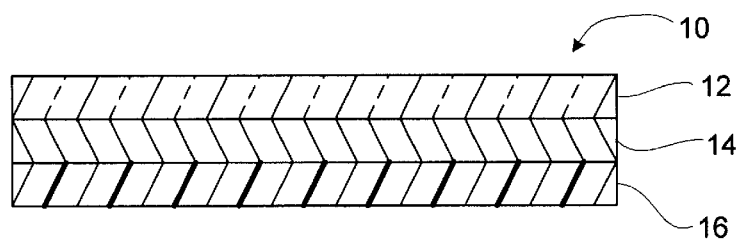
FIG. 1 is a fragmentary cross sectional view of the UV curable adhesive article.

The protective coating of the present invention is formed by applying a curable adhesive article to the surface of the color filter. The adhesive article comprises a pressure sensitive adhesive layer and a transparent carrier film overlying the adhesive layer. The adhesive article may also include a thin layer of epoxy coated onto a transparent carrier film and overlying the pressure sensitive adhesive layer. After affixing the pressure sensitive adhesive side of the adhesive article to the surface of the color filter, portions of the adhesive article are exposed to UV radiation. The transparent carrier film is then removed, leaving the cured epoxy layer, if present, and cured pressure sensitive adhesive portions on the surface of the color filter. The uncured epoxy portions and pressure sensitive adhesive portions are removed with the transparent carrier film. The structure consisting of the cured epoxy layer, pressure sensitive layer, color filter and transparent substrate is then baked to cure the epoxy layer and adhesive layer.

Pressure sensitive adhesives useful in one embodiment of the present invention should have adequate adhesion to the epoxy layer throughout the manufacturing process. The uncured pressure sensitive adhesive should be easily removable from the transparent substrate on which the color filter is formed. The cured pressure sensitive adhesive should adhere to the color filter and adhere to the epoxy layer so that the cured epoxy layer may be removed from the carrier film. The baked pressure sensitive adhesive should anchor the baked epoxy layer to the color filter and should transmit light.

In one embodiment, the protective coating overlying the color filter has a thickness in the range of about 1 to about 10 microns, provides a relatively smooth surface for the subsequent transparent electrode (ITO (indium tin oxide) coating), and is resistant to heat up to at least 18° C. The protective coating is optically transparent. The pressure sensitive adhesive of the present invention transforms upon UV radiation exposure from a removable adhesive to a permanent adhesive, and upon heat treatment to a near structural adhesive to support the steps of the process of making a protective coating for the color filter. The pressure sensitive adhesive contains at least one acrylic copolymer and may contain at least one photoinitiator. The pressure sensitive adhesive may also contain at least one acrylated urethane oligomer, and may also contain a silane coupling agent to improve adhesion.

Useful acrylic copolymers include high performance pressure sensitive adhesives, which contain a glycidyl acrylate monomer. Particularly useful acrylic pressure sensitive adhesives include acrylic and/or methacrylic ester based copolymers comprising, on a copolymerized basis, from about 55% to about 85% by weight of a monomer selected from the group consisting of alkyl acrylate esters and alkyl methacrylate esters containing from 4 to about 12 carbon atoms in the alkyl group, from about 0. 1% to about 2% by weight of glycidyl monomer, about 0% to about 20% by weight of an N-vinyl lactam monomer, from about 0 to about 15% by weight of an ethylenically unsaturated carboxylic acid, and from 0 to about 35% by weight of an alkyl acrylate or methacrylate ester containing less than 4 carbon atoms in the alkyl group.

The alkyl acrylate and methacrylate esters containing 4 to about 12 carbon atoms in the alkyl group useful in forming the acrylic copolymers include 2-ethyl hexyl acrylate, isooctyl acrylate, butyl acrylate, sec-butyl acrylate, methyl butyl acrylate, 4-methyl-2-pentyl acrylate, isodecyl methacrylate and the like, and mixtures thereof. The glycidyl acrylate monomers useful in forming the acrylic copolymers include glycidyl acrylate and glycidyl methacrylate and mixtures thereof. The N-vinyl lactam monomers that may be used include N-vinyl pyrrolidone, N-vinyl caprolactam, 1-vinyl-2-pipericone, 1-vinyl-5-methyl-2-pyrrolidone and the like. Ethylenically unsaturated carboxylic acids include acrylic acid, methacrylic acid, fumaric acid and the like. Alkyl acrylate and methacrylate esters containing less than 4 carbon atoms in the alkyl group include methyl acrylate, ethyl acrylate, methyl methacrylate and the like. Other monomers that can be included are polystyryl ethyl methacrylate, acetoacetoxy ethyl methacrylate, alpha olefins such as ethylene and propylene and vinyl esters of alkanoic acids containing more than three carbon atoms as well as mixtures thereof. Such monomers are in the range of from 0 to about 35 percent by weight of the total monomers.

The copolymers may be synthesized using solution, emulsion, and batch polymerization techniques. It is preferred to prepare the copolymers in solution using a mixture of solvents. The present preferred solution polymerization involves the use of blends of ethyl acetate and hexane or ethyl acetate and acetone. The ratio of solvents is adjusted to provide a reflux temperature of from about 68° C. to about 78° C. Solids content during polymerization may typically range from about 40% to about 60% in order to achieve the desired weight average molecular weight, and yet achieve viscosities that are manageable in the reactor. Reaction occurs in the presence of free-radical initiators, preferably of the azo type, for example, 2,2'-azobis (isobutyronitrile). The polymers formed are solvent soluble polymers with essentially no crosslinking. To this end, the glycidyl acrylate monomer is preferably limited to 2% by weight of the total monomers to avoid the possibility of cross-linking, by opening of the oxirane group, during polymerization or during aging. Polymers can be post-polymerization cross-linked using radiation. Such acrylic copolymers are described in U.S. Pat. No. 4,812,541, incorporated herein by reference.

Useful acrylated urethane oligomers include acrylate esters that are formed by the reaction of (a) an acrylate ester containing an active hydrogen atom in the alcoholic moiety of the ester, with (b) an organic polyisocyanate. Compositions including this general type of ester are disclosed in U.S. Pat. No. 3,425,988. In one embodiment, the active hydrogen is the hydrogen of a hydroxyl or a primary or secondary amine substituent on the alcoholic moiety of the ester, and the polyisocyanate is a diisocyanate. An excess of the acrylate ester should be used to ensure that each isocyanate functional group in the polyisocyanate is substituted.

The acrylate esters used in the manner described in the preceding paragraph may be those in which the acrylate ester is a substituted alkyl or aryl acrylate ester. Such acrylate esters include those having the formula:

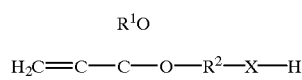

wherein X is —O— or —N($R^3$)—, and wherein $R^1$ is selected from the group consisting of hydrogen, halogen, and lower alkyls of from 1 to about 4 carbon atoms; $R^2$ is an alkylene group with from 1 to 10 carbon atoms, or a divalent aromatic radical containing up to 14 carbon atoms, such as phenylene, biphenylene or naphthylene; and $R^3$ is a hydrogen atom or a hydrocarbyl group containing up to 10 carbon atoms, and is preferably a hydrogen atom or an alkyl or aralkyl group with from 1 to 10 carbon atoms. $R^2$ and $R^3$ can contain any substituents or linkages that do not adversely affect the molecule for its intended use herein.

Typical polyisocyanates which can be reacted with the above acrylate esters to form polyacrylate monomers are toluene diisocyanate, 4,4'-diphenyl diisocyanate, di-anisidine diisocyanate, cyclohexylene diisocyanate, 2-chloropropane diisocyanate, 4,4'-diphenylmethane diisocyanate, 2,2'-diethyl ether diisocyanate, 3-(dimethylamino)-pentane diisocyanate, tetrachlorophenylene diisocyanate-1,4 and trans-vinylene diisocyanate. Still other polyisocyanates that may be used are higher molecular weight polyisocyanates obtained by reacting an excess of any of the above described isocyanates with polyamines containing terminal, primary and secondary amine groups, or polyhydric alcohols, for example, the alkane and alkene polyols such as glycerol, 1,2,6-hexanetriol, 1,5-pentanediol, ethylene glycol, polyethylene glycol, 4,4'-dihydroxydiphenyldimethylmethane and condensation products of alkylene oxides with 4,4'-dihydroxydiphenyldimethylmethane. Such acrylated urethane oligomers are described in U.S. Pat. No. 4,092,374, which is incorporated herein by reference.

Examples of suitable acrylated urethane oligomers include aliphatic polyether urethane acrylates, diacrylates and polyacrylates; aliphatic polyester urethane acrylates, diacrylates and polyacrylates, aromatic polyether urethane acrylates, diacrylates and polyacrylates; and aromatic polyester urethane acrylates, diacrylates and polyacrylates. Examples of useful commercially available urethane acrylates include Ebecryl® 8803 and Ebecryl® 8807 from UCB Chemical Corp.

Useful photo initiators include acetophenone, benzophenone, benzyldimethylketal, benzoyl peroxide, isobutyl benzoin ether, isopropyl thioxanthone, diethoxy acetophenone and 2-chlorothioxyanthone. A particularly useful photoinitiator is benzophenone.

Silane coupling agents useful herein include vinylsilane, acrylsilane, epoxysilane and aminosilane. More specifically, examples of vinylsilanes useful herein include vinyltrichlorosilane, vinyltris(β-methoxyethoxy)silane, vinyl triethoxysilane and vinyltrimethoxysilane. Examples of acrylsilanes useful herein include γ-methacryloxypropyltrimethoxysilane, and γ-methacryloxypropylmethyldimethoxysilane. Examples of epoxysilanes useful herein include β-(3,4-epoxycyclohexyl) ethyltrimethoxysilane, γ-glycidoxypropyltrimethoxysilane, and γ-glycidoxypropylmethyldiethoxysilane. Examples of aminosilanes useful herein include N-γ-(aminoethyl)-γ-aminopropyltrimethoxysilane, N-β-(aminoethyl)-γ-aminopropylmethylditrimethoxysilane, γ-aminopropyltriethoxysilane and N-phenyl-γ-aminopropyltrimethoxysilane. Examples of other silane coupling agents useful herein include γ-mercaptopropyltrimethoxysilane, γ-chloropropyltrimethoxysilane, γ-chloropropylmethyldimethoxysilane, and γ-chloropropylmethyldiethoxysilane.

In one embodiment of the present invention, the radiation curable adhesive layer comprises about 60% by weight to 100% by weight of an acrylic pressure sensitive adhesive and 0% by weight to about 40% by weight of an acrylate urethane oligomer. In another embodiment, the radiation curable adhesive layer comprises about 65% by weight to about 80% by weight of an acrylic pressure sensitive adhesive and about 20% by weight to about 35% by weight of an acrylate urethane oligomer. In yet another embodiment, the radiation curable adhesive layer comprises about 70% by weight of an acrylic pressure sensitive adhesive and about 30% by weight of an acrylate urethane oligomer.

Epoxy resins useful for making the epoxy layer of the present invention include epoxy resins and polymeric epoxy resins. These resins can vary greatly in the nature of their backbones and substituent groups. The epoxy resins of the invention can undergo initial curing upon exposure to UV radiation via a free radical mechanism with the addition of an appropriate photoinitiator. Final curing of the epoxy resin layer is accomplished by heating the epoxy resin.

A particularly useful epoxy layer is formed from a mixture of a diglycidyl ether of bisphenol A, an epoxy diacrylate and an amine curing agent. Epon®825, a bisphenol A epichlorohydrin epoxy resin commercially available from Shell Chemical Co., is an example of a diglycidyl ether of bisphenol A. An epoxy diacrylate useful in the present invention is Ebecryl® 3700, a bisphenol A epoxy diacrylate commercially available from UCB Chemical Corp.

The amine curing agent may be any suitable diamine. Typical of such amine curing agents are aliphatic amines, cycloaliphatic amines, and adducts and mixtures thereof. An example of a useful amine curing agent is EPI-Cure® 3382, a cycloaliphatic amine adduct commercially available from Shell Chemical Co.

The transparent carrier film used in making the adhesive articles of the invention may comprise any transparent polymer film. As used herein the term "transparent" means that the film does not absorb a significant amount UV radiation and does not reflect a significant amount of UV radiation, rather, it is transparent to UV radiation. Examples of polymer films useful as the substrate layer include films made of polyolefin, polyester, polyvinyl chloride, polyvinyl fluoride, polyvinylidene difluoride, etc., and combinations thereof. The film used may be in the form of a tape or a label. The film can be cut to the desired dimensions to cover the color filter by, for example, die cutting, laser cutting, or any other known cutting method.

In one embodiment of the present invention, the adhesive article is prepared by coating a pressure sensitive adhesive composition onto a transparent carrier film, drying at an elevated temperature, for example at about 70° C., to remove the solvent and form the pressure sensitive layer at a coat weight of about 1.0 to about 2.0 microns.

The adhesive article may be further described by reference to FIG. 1. A multilayer adhesive article 10 is disclosed which is comprised of a transparent film 12, onto which radiation curable adhesive layer 14 is coated. Release liner 16 is releasably adhered to adhesive layer 14. Release liner 16 protects the adhesive layer and prevents inadvertent bonding prior to use. The release liner that can be used in the adhesive article of the present invention can be any release liner known in the art. The adhesive article may be an adhesive tape, or may be an adhesive label.

In another embodiment of the present invention, the adhesive article is prepared by w coating an epoxy resin composition onto a transparent carrier film to form an epoxy layer, drying the coated epoxy layer at an elevated temperature, about 100° C., to remove the solvent and to make a gelled epoxy layer at a coat weight of about 0.5 to about 1.0 microns. The pressure sensitive adhesive composition is then coated onto the gelled epoxy layer, dried at an elevated temperature, about 70° C., to remove the solvent and to form the pressure sensitive layer at a coat weight of about 1.0 to about 2.0 microns.

Figure 2:
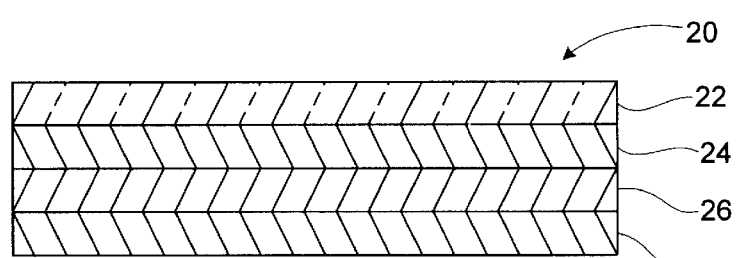
FIG. 2 is a fragmentary cross sectional view of the UV curable adhesive article that includes an epoxy layer.

The adhesive article may be further described by reference to FIG. 2. A multilayer epoxy tape 20 is disclosed which is comprised of a transparent film 22, onto which a radiation curable epoxy layer 24 is coated. Radiation curable adhesive layer 26 is adhered to epoxy layer 24. Release liner 28 is releasably adhered to adhesive layer 26. Release liner 28 protects the adhesive layer and prevents inadvertent bonding prior to use. The release liner that can be used in the epoxy tape of the present invention can be any release liner known in the art. The multilayer epoxy tape 20 may be constructed by first coating the epoxy layer 24 onto transparent film 22, followed by coating adhesive layer 26 onto epoxy layer 24, and then laminating release liner 28 onto adhesive layer 26. Alternatively, the multilayer epoxy tape 20 may be constructed by first coating the epoxy layer 24 onto transparent film 22. Coating adhesive layer 26 onto release liner 28, and then laminating release liner 28 coated with adhesive layer 26 onto epoxy layer 24, so that adhesive layer 26 is adhered to epoxy layer 24.

To prepare the protective coating, the adhesive article is laminated onto the color filter plate. A UV mask is placed over the adhesive article and the adhesive article is exposed to UV light through the UV mask. In one embodiment, the UV light is applied from a Fusion Systems medium pressure mercury D bulb at 5400 millijoules per square centimeter total dosage. The adhesive article is then cooled and removed, leaving the cured epoxy layer and pressure sensitive adhesive on the color filter plate and removing the uncured epoxy layer and pressure sensitive adhesive with the carrier film. Heat treatment (post-baking) after the completion of the exposure of the coating of the radiation curable composition and the removal of the carrier film may generally be carried out under conditions of 120 to 250° C. for about 5 to 90 minutes.

Figure 3A:
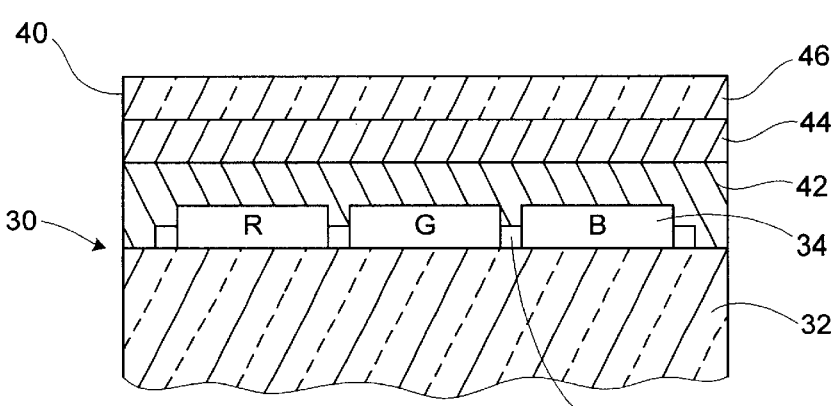
FIGS. 3A to 3D are fragmentary cross sectional views showing the steps of a process of preparing a color filter protective coating in accordance with the present invention, wherein the adhesive article is an epoxy-containing tape.

The process of preparing the protective coating according to the present invention will be described in more detail with reference to FIGS. 3A to 3C. As shown in FIG. 3A, the color filter 30 onto which the protective coating is applied consists of transparent substrate 32, colored layer 34 and black matrix 36, each having a predetermined pattern provided on the transparent substrate 32. The transparent substrate may be made of nonflexible rigid materials such as quartz glass, Pyrex glass and synthetic quartz plate, or flexible materials such as transparent resin films and resin plates for optical purposes. The colored layer 34 of the color filter has a red pattern 34R, a green pattern 34G, and a blue pattern 34B arranged in a desired form such as mosaic, stripe, triangular, or four-pixel placement. The black matrix 36 is provided between adjacent color patterns and the outside of the colored layer 34 forming region in its predetermined portion.

The colored layer 34 may be formed by any method, for example, a dyeing method which comprises coating a dyeing substrate, exposing the dyeing substrate through a photomask, developing the exposed resist, a printing method wherein each color is printed using printing inks, or an electrodeposition method which comprises previously forming a transparent conductive layer on a transparent substrate, forming a positive-working resist layer to expose predetermined portions of the transparent conductive layer, immersing the transparent substrate in an electrodeposition liquid, and, in this state, energizing the transparent conductive layer to perform electrodeposition, thereby forming a colored layer.

The black matrix 36 also may be formed by any one of the dyeing method, pigment dispersion method, printing method, and electrodeposition method. Further, chromium vapor deposition or the like may be used for the formation of the black matrix 36.

An epoxy tape 40, which consists of adhesive layer 42, epoxy layer 44 and transparent carrier 46, is laminated onto the colored layer 34 so that the outer surface of adhesive layer 42 is in contact with the outer surface of colored layer 34 and the exposed surface of transparent substrate 32.

Figure 3B:
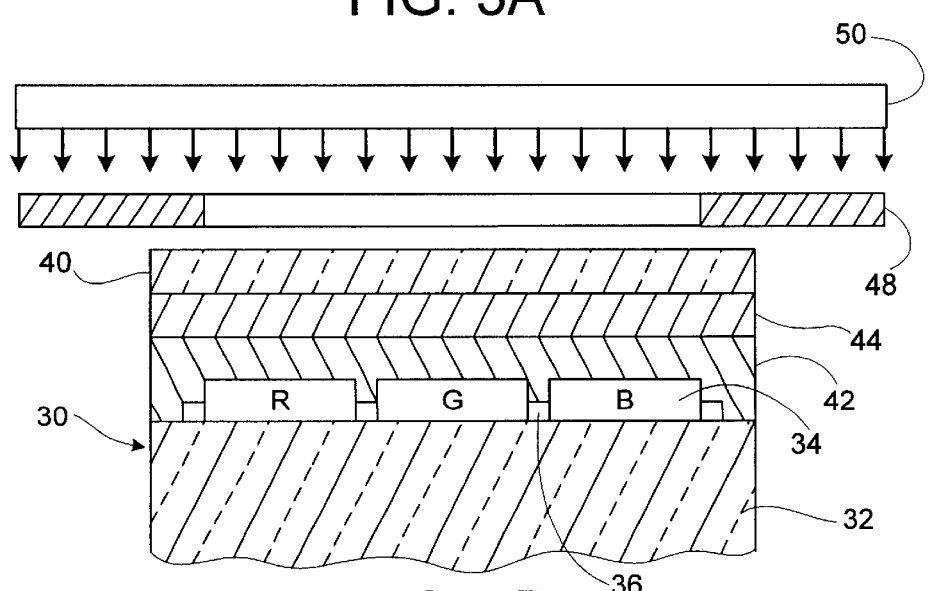
Figure 3C:
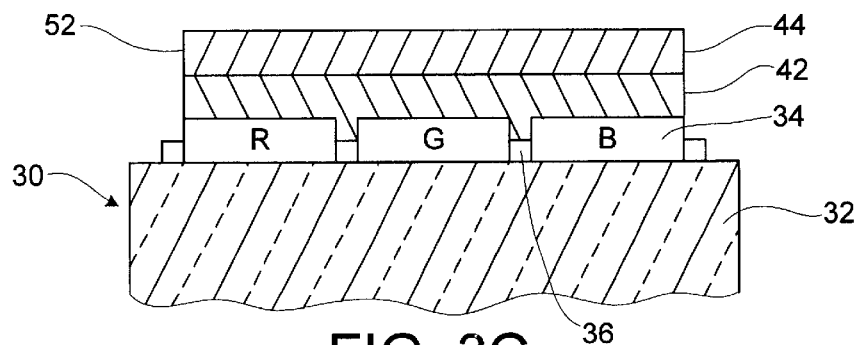

Referring to FIG. 3B, photomask 48 is placed over transparent carrier 46. Exposure is carried out by applying ultraviolet light from light source 50 through photomask 48. After exposure, transparent carrier 46 is removed along with the uncured portions of epoxy layer 44 and adhesive layer 42. The remaining multilayer structure, as shown in FIG. 3C comprises the transparent substrate 32, color layer 34, black matrix 36, and protective coating 52. Protective coating 52 consists of cured adhesive layer 42 and cured epoxy layer 44. This structure is baked to post cure the epoxy layer and the adhesive layer.

Figure 3D:
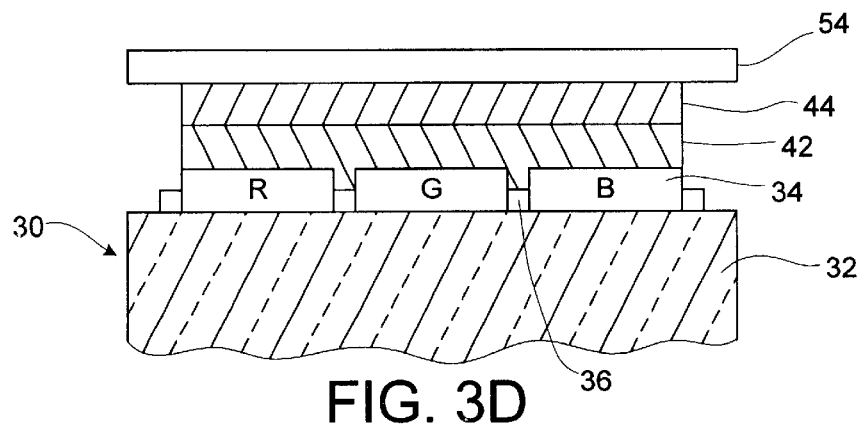

Referring to FIG. 3D, transparent electrode 54 may be provided on the protective layer 52 by a conventional film forming method, such as sputtering, vacuum deposition, or chemical vapor deposition, using indium tin oxide (ITO), zinc oxide, tin oxide, or an alloy thereof. The thickness of the transparent electrode is about 20 to 500 nm, preferably about 100 to 300 nm.

Figure 4A:
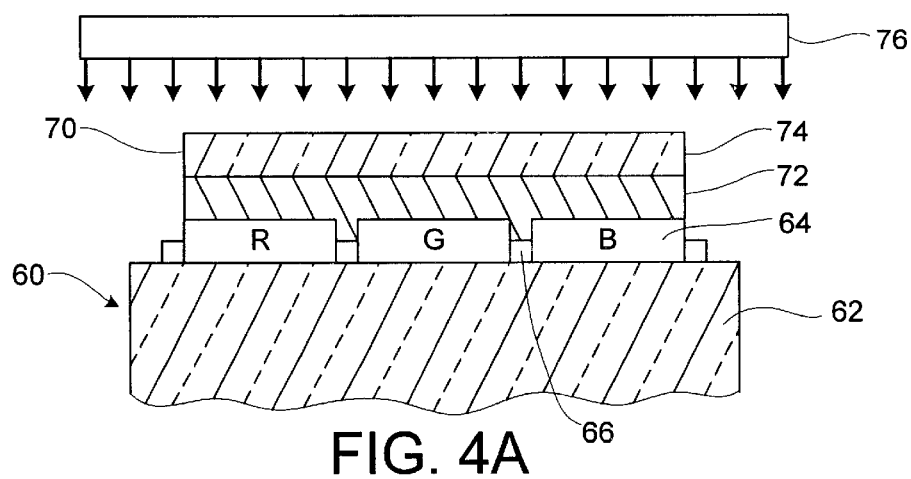
FIGS. 4A to 4B are fragmentary cross sectional views showing the steps of a process of preparing a color filter protective coating according to the present invention wherein the adhesive article is an adhesive label.
Figure 4B:
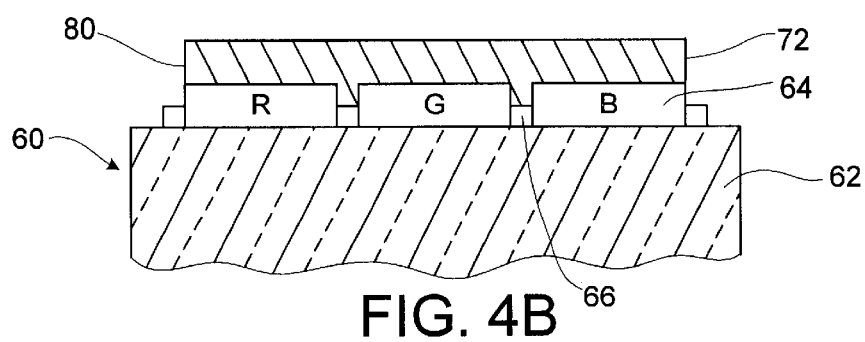

In another embodiment of the present invention, the adhesive article may be an adhesive label. The adhesive label may or may not contain an epoxy layer positioned between the transparent carrier and the adhesive layer. Referring to FIGS. 4A and 4B, the method of making the protective coating using an adhesive label will be described. As shown in FIG. 4A, the color filter 60 onto which the protective coating is applied consists of transparent substrate 62, colored layer 64 and black matrix 66, each having a predetermined pattern provided on the transparent substrate 62.

An adhesive label 70, which consists of adhesive layer 72 and transparent carrier 74, is laminated onto the colored layer 64 so that the outer surface of adhesive layer 72 is in contact with the outer surface of colored layer 64. Because adhesive layer 72 does not contact the exposed surface of transparent substrate 62, a photomask is not needed for the application of ultraviolet light from light source 76. Other curing techniques may be used, such as ionizing radiation, i.e., gamma or electron beam.

Referring to FIG. 4B, transparent carrier 74 is removed after UV exposure. The remaining multilayer structure comprises the transparent substrate 62, color layer 64, black matrix 66, and protective coating 80. Protective coating 80 is cured adhesive layer 72. This structure is baked to post cure the adhesive layer. A transparent electrode may then be provided on the protective layer 80 by a conventional film forming method.

In another embodiment of the present invention, the protective coating of the present invention is made by applying to the color layer an adhesive layer comprising a curable anaerobic pressure sensitive adhesive. Anaerobic adhesives are those that are stable in the presence of oxygen, but will polymerize in the absence of oxygen. Polymerization is initiated by the presence of a peroxy compound. The cured, crosslinked resins serve as adhesives. Anaerobic pressure sensitive adhesive systems useful in the present invention generally comprise one or more polymerizable acrylate esters, a thermoplastic polymer and a peroxy initiator. As used herein, acrylate esters include the alpha-substituted acrylate esters, such as methacrylate, ethacrylate and chloroacrylate esters.

Of particular utility are polymerizable di- and other polyacrylate esters that, because of their ability to form cross-linked polymers, have more highly desirable adhesive properties. However, monoacrylate esters can be used, particularly if the non-acrylate portion of the ester contains a hydroxyl or amino group, or other reactive substituent that serves as a site for potential crosslinking. Examples of monomers of this type are hydroxyethyl methacrylate, cyano acrylate, t-butylaminoethyl methacrylate and glycidyl methacrylate. Anaerobic properties are imparted to the acrylate ester monomers by combining them with a peroxy polymerization initiator.

Examples of polymerizable polyacrylate esters useful in the anaerobic adhesives include di-, tri- and tetra-ethylene glycol dimethacrylate, dipropylene glycol dimethacrylate, polyethylene glycol dimethacrylate, di(pentamethylene glycol) dimethacrylate, tetraethylene glycol diacrylate, tetraethylene glycol di (chloroacrylate), diglycerol diacrylate, diglycerol tetramethacrylate, tetramethylene dimethacrylate, ethylene dimethacrylate, neopentyl glycol diacrylate and trimethylol propane triacrylate. Additional examples of such polymerizable polyacrylate esters are disclosed in U.S. Pat. No. 4,092,374, incorporated herein by reference.

Yet another class of acrylate esters are those which are formed by the reaction of: (a) an acrylate ester containing an active hydrogen atom in the alcoholic moiety of the ester; with (b) an organic polyisocyanate. These acrylate esters are described above in connection with the acrylated urethane oligomers. Compositions including this general type of ester are disclosed in U.S. Pat. No. 3,425,988, incorporated herein by reference.

By the term "thermoplastic polymer", there is meant one or more high molecular weight thermoplastic polymers that, alone or in admixture, have a high enough average molecular weight, so that the resultant curable anaerobic pressure sensitive adhesive composition has sufficient cohesive strength to be transferred from a conventional release surface to a substrate. Typical of the thermoplastic polymers which can be used are polyvinyl chloride, polyvinyl ethers, polyvinyl acetates, acrylate polymers, polyurethanes, polyesters, polyamides, natural and synthetic elastomers, and mixtures thereof. The preferred thermoplastic polymers are acrylic based polymers. Of particular utility are the acrylic copolymers described above.

In another embodiment of the present invention, the protective coating of the present invention is made by applying to the color layer an adhesive layer comprising a thermally curable pressure sensitive adhesive. Such pressure sensitive adhesives, which harden upon exposure to heat, are known to those skilled in the art.

While not limiting, the following examples illustrate the invention.

EXAMPLE 1

An adhesive composition was prepared by combining 70 parts by weight of an acrylic copolymer; 30 parts by weight of Ebecryl® 8803 (an aliphatic urethane acrylate from UCB Chemicals Corp.); 1.4 parts by weight of benzophenone; 1.4 parts by weight of methyldiethanolamine; 0.6 parts by weight of aluminum acetylacetonate; and 0.6 parts by weight of gamma-methacryloxypropyltrimethoxysilane (Silquest A-174 from Witco Corp). The acrylic copolymer was prepared from polymerizing the following monomers (percentages are percent by weight):

67.5% 2-ethylhexyl acrylate
23.2% methyl acrylate
7.0% acrylic acid
2.0% vinyl pyrrolidone
0.3% glycidyl methacrylate The acrylic copolymer had a solids content of 36.1% and a viscosity of 3950 centipoises. The pressure sensitive adhesive composition had a solids content of 12%.

EXAMPLE 2

An adhesive composition was prepared by combining 100 parts by weight of an acrylic copolymer and 0.6 parts by weight of aluminum acetylacetonate. The acrylic copolymer was prepared from polymerizing the following monomers (percentages are percent by weight):

67.5% 2-ethylhexyl acrylate
23.2% methyl acrylate
7.0% acrylic acid
2.0% vinyl pyrrolidone
0.3% glycidyl methacrylate The acrylic copolymer had a solids content of 36.1% and a viscosity of 3950 centipoises. The pressure sensitive adhesive composition had a solids content of 12%.

EXAMPLE 3

An adhesive composition was prepared by combining 84 parts by weight of an acrylic copolymer; 16 parts by weight of Ebecryl® 8803 (an aliphatic urethane acrylate from UCB Chemicals Corp.); 1.4 parts by weight of benzophenone; 1.4 parts by weight of methyldiethanolamine; 0.6 parts by weight of aluminum acetylacetonate; and 0.6 parts by weight of gamma-methoacryloxpropyltrimethoxysilane (Silquest A-174 from Witco Corp). The acrylic copolymer was prepared from polymerizing the following monomers (percentages are percent by weight):

67.5% 2-ethylhexyl acrylate
23.2% methyl acrylate
7.0% acrylic acid
2.0% vinyl pyrrolidone
0.3% glycidyl methacrylate The acrylic copolymer had a solids content of 36.1% and a viscosity of 3950 centipoise. The pressure sensitive adhesive composition had a solids content of 12%.

EXAMPLE 4

An adhesive composition was prepared by combining 55 parts by weight of an acrylic copolymer; 45 parts by weight of Ebecryl® 8803 (an aliphatic urethane acrylate from UCB Chemicals Corp.); 1.4 parts by weight of benzophenone; 1.4 parts by weight of methyldiethanolamine; 0.6 parts by weight of aluminum acetylacetonate; and 0.6 parts by weight of gamma-methacryloxypropyltrimethoxysilane (Silquest A-174 from Witco Corp). The acrylic copolymer was prepared from polymerizing the following monomers (percentages are percent by weight):

67.5% 2-ethylhexyl acrylate
23.2% methyl acrylate
7.0% acrylic acid
2.0% vinyl pyrrolidone
0.3% glycidyl methacrylate The acrylic copolymer had a solids content of 36.1% and a viscosity of 3950 centipoise. The pressure sensitive adhesive composition had a solids content of 12%.

EXAMPLE 5

An epoxy composition was prepared by combining 48.5 parts by weight of bisphenol A epichlorohydrin epoxy resin (Epon® 825 from Shell Chemical Co.); 32.3 parts by weight Ebecryl® 3700 (a bisphenol A epoxy diacrylate from UCB Chemical Corp.); 18.4 parts by weight of EPI-Cure® 3382 (cycloaliphatic amine adducts from Shell Chemical Co.); and 1.0 part by weight benzophenone. The epoxy composition has a solids content of 55%.

Epoxy-Containing Tape

The epoxy composition of Example 5 was coated onto a 1.5 mil polyethylene terephthalate (PET) transparent film, and then dried for 20 minutes at 100° C. to remove the solvent and to make a gelled epoxy layer on each of the PET films of a coat weight of 0.5 to 1.0 microns. The adhesive of Example 1 was then coated onto an epoxy coated PET film, so that the adhesive layer overlies the epoxy layer. The coated PET film was then dried for 15 minutes at 70° C. to remove the solvent and form the gelled adhesive layer of a coat weight of 1.0 to 2.0 microns. The coated PET film, or tape, was then laminated onto a color filter plate, adhesive side down, and a photomask was applied to the outside surface of the PET film. The tape over the color filter was exposed to UV light, through, the mask, from a medium pressure mercury D bulb at 5400 millijoules per square centimeter total dosage. The structure was then cooled and the tape was removed. The remaining cured epoxy/adhesive coated color filter was then baked for 10 minutes at 200° C. and then cooled. This same procedure was carried out for the adhesives of Examples 2–4.

Epoxy-Free Tape

The adhesive of Example 1 was coated directly onto a 1.5 mil polyethylene terephthalate (PET) transparent film, or tape, and then dried for 15 minutes at 70° C. to remove the solvent and form the gelled adhesive layer of a coat weight of 1.0 to 2.0 microns. The coated PET film was then laminated onto a color filter plate, adhesive side down, and a photomask was applied to the outside surface of the PET film. The tape over the color filter was exposed to UV light, through, the mask, from a medium pressure mercury D bulb at 5400 millijoules per square centimeter total dosage. The structure was then cooled and the tape was removed. The remaining cured adhesive coated color filter was then baked for 10 minutes at 200° C. and then cooled.

Table 1 below shows the results of the evaluation of the uncured adhesives of Examples 1–4 and lists the glass transition temperature, viscoelastic index, dynamic storage shear modulus and dynamic loss shear modulus. Table 2 shows the results of the evaluation of the UV cured adhesives of Examples 1–4, and Table 3 shows the results of the evaluation of the UV cured and baked adhesives of Examples 1–4.

The tan d value is directly related to the adhesive dissipation, or peel strength of the adhesive. The lower the tan d value, the more removable the adhesive. Referring to Table 1, it can be seen that Adhesive 1 exhibits the most removable performance of the adhesives in their uncured state. As Adhesive 1 is cured (Table 2), the Tg increases, indicating that the adhesive is transformed from a removable adhesive to a permanent adhesive. The Tg increase is accompanied by a sharp increase in cohesive strength (G') and an insignificant drop in tan d. These rheological changes are consistent with a complete transfer onto the color layer. Upon baking (Table 3), the Tg of Adhesive 1 is further increased, with an accompanying increase in G' and G" values, indicating a near structural adhesive.

Figure 5:
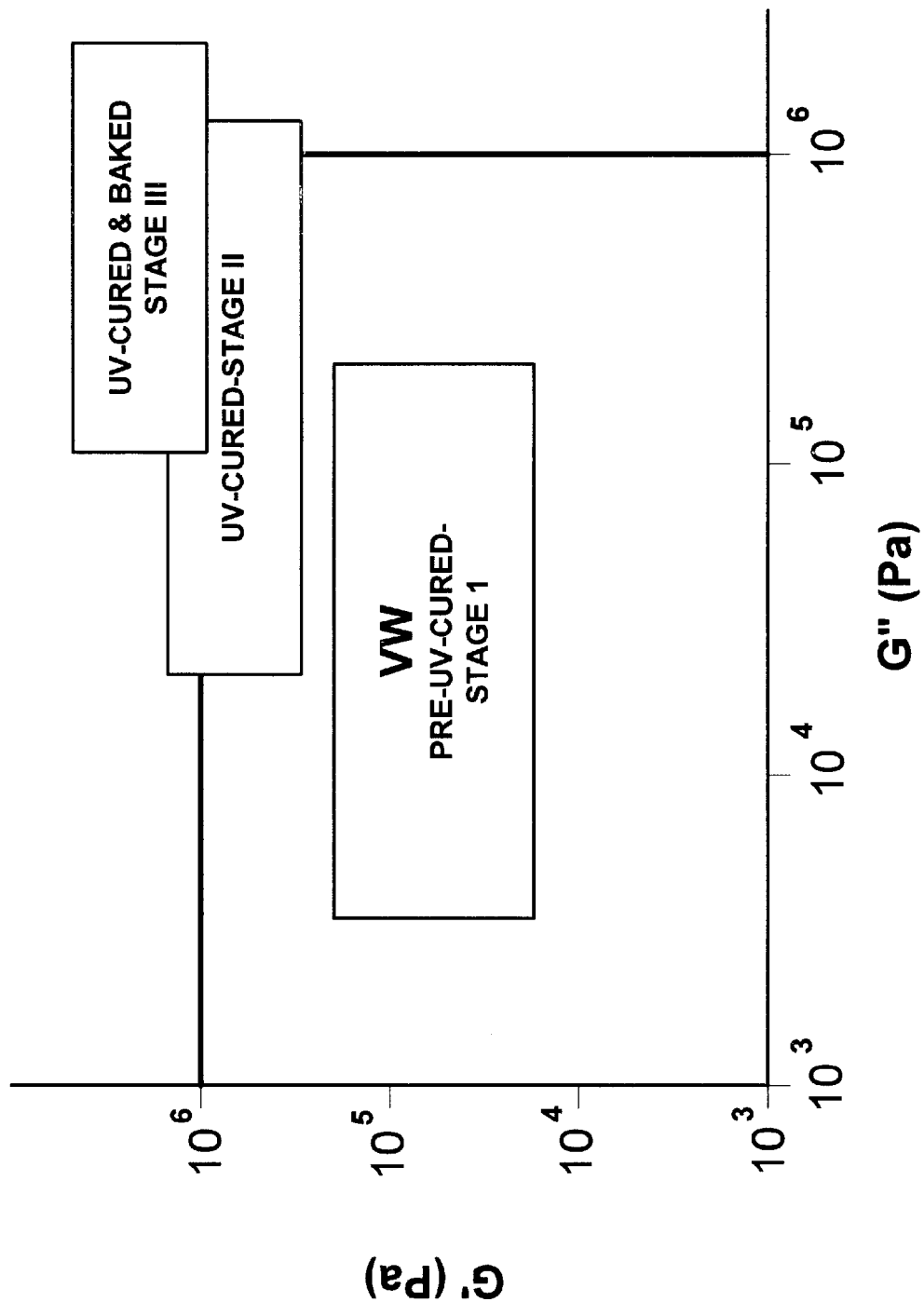
FIG. 5 is a plot of the viscoelastic properties of the adhesive usefull in the present invention.

The Theological footprints of Adhesive 1 at the successive stages of transformation from an uncured removable adhesive to a UV-cured permanent adhesive, to a near structural adhesive are illustrated in FIG. 5 by its viscoelastic window. Adhesives having similar viscoelastic windows are particularly useful in the present invention.

TABLE 1

| Example | Adhesive 1 | Adhesive 2 | Adhesive 3 | Adhesive 4 |
|---|---|---|---|---|
| Tg (° C.) | −5 | 0 | −5 | −2.5 |
| tan d at Tg | 1.19 | 1.41 | 1.275 | 1.35 |
| G' at 23° C. | $1.50 \times 10^5$ | $2.10 \times 10^5$ | $1.50 \times 10^5$ | $1.80 \times 10^5$ |
| G" at 23° C. | $1.26 \times 10^5$ | $1.90 \times 10^5$ | $1.37 \times 10^5$ | $1.70 \times 10^5$ |
| tan d at 23° C. | 0.84 | 0.89 | 0.89 | 0.97 |
| G' at 0.01 rad/s | $1.70 \times 10^4$ | $2.80 \times 10^4$ | $2.30 \times 10^4$ | $1.50 \times 10^4$ |
| G" at 0.01 rad/s | $3.40 \times 10^3$ | $3.30 \times 10^3$ | $5.80 \times 10^3$ | $2.70 \times 10^3$ |
| G' at 100 rad/sec | $2.10 \times 10^5$ | $3.70 \times 10^5$ | $2.90 \times 10^5$ | $1.70 \times 10^5$ |
| G" at 100 rad/sec | $2.30 \times 10^5$ | $3.50 \times 10^5$ | $3.10 \times 10^5$ | $2.00 \times 10^5$ |

Tg = glass transition temperature
tan d = viscoelastic index
G' = dynamic storage shear modulus, Pa (Method E of ASTM D-4065-82)
G" = dynamic loss shear modulus, Pa (Method E of ASTM D-4065-82)

TABLE 2

| Example | Adhesive 1 | Adhesive 2 | Adhesive 3 | Adhesive 4 |
|---|---|---|---|---|
| Tg (° C.) | 8 | 1 | 5 | 8.5 |
| tan d at Tg | 0.82 | 1.39 | 1.01 | 0.72 |
| G' at 23° C. | $3.50 \times 10^5$ | $1.70 \times 10^5$ | $3.00 \times 10^5$ | $1.30 \times 10^6$ |
| G" at 23° C. | $1.01 \times 10^6$ | $1.39 \times 10^5$ | $2.30 \times 10^5$ | $8.50 \times 10^5$ |
| tan d at 23° C. | 0.82 | 0.84 | 0.76 | 0.62 |
| G' at 0.01 rad/s | $2.60 \times 10^5$ | $5.3 \times 10^4$ | $1.06 \times 10^5$ | $4.40 \times 10^5$ |
| G" at 0.01 rad/s | $1.90 \times 10^4$ | $8.50 \times 10^3$ | $5.60 \times 10^3$ | $4.40 \times 10^4$ |

TABLE 2-continued

| Example | Adhesive 1 | Adhesive 2 | Adhesive 3 | Adhesive 4 |
|---|---|---|---|---|
| G' at 100 rad/sec | $1.44 \times 10^6$ | $6.30 \times 10^5$ | $1.00 \times 10^6$ | $2.50 \times 10^6$ |
| G" at 100 rad/sec | $1.15 \times 10^6$ | $6.80 \times 10^5$ | $6.90 \times 10^5$ | $1.80 \times 10^6$ |

TABLE 3

| Example | Adhesive 1 | Adhesive 2 | Adhesive 3 | Adhesive 4 |
|---|---|---|---|---|
| Tg (° C.) | 10.5 | 0 | 10 | 5.2 |
| tan d at Tg | 0.45 | 1.41 | 0.59 | 0.55 |
| G' at 23° C. | $3.40 \times 10^6$ | $2.10 \times 10^5$ | $2.10 \times 10^6$ | $2.90 \times 10^6$ |
| G" at 23° C. | $1.40 \times 10^6$ | $1.90 \times 10^5$ | $8.00 \times 10^5$ | $1.10 \times 10^6$ |
| tan d at 23° C. | 0.4 | 0.89 | 0.52 | 0.39 |
| G' at 0.01 rad/s | $9.40 \times 10^5$ | $2.80 \times 10^4$ | $7.90 \times 10^5$ | $7.20 \times 10^5$ |
| G" at 0.01 rad/s | $1.19 \times 10^5$ | $3.30 \times 10^3$ | $4.40 \times 10^4$ | $6.90 \times 10^4$ |
| G' at 100 rad/sec | $4.70 \times 10^6$ | $3.70 \times 10^5$ | $2.90 \times 10^6$ | $2.80 \times 10^6$ |
| G" at 100 rad/sec | $2.30 \times 10^6$ | $3.50 \times 10^5$ | $1.80 \times 10^6$ | $1.40 \times 10^6$ |

The performance of each of the adhesives in an epoxy-containing adhesive tape was evaluated. When the adhesive article is an adhesive tape, the protective coating for the color filter is produced by positioning the adhesive tape over the color filter so that the adhesive layer is in contact with the glass substrate underlying the color filter. The adhesive tape is exposed to UV radiation through a photomask, resulting in the adhesive layer containing portions of uncured adhesive on the glass substrate, and portions of cured adhesive overlying the color layer of the color filter. When the adhesive tape is removed after exposure to UV radiation, it is desirable to obtain a "clean" edge between the cured and uncured portions of adhesive, with the uncured adhesive removed from the glass substrate and the cured adhesive anchored to the color layer.

Table 4 below shows the percentage of the uncured adhesive layer that remained on the glass substrate of the color filter when the transparent carrier was removed (100% indicates adhesive was completely removed). Also shown is the percentage of the cured adhesive that was transferred to the color layer of the color filter after the transparent carrier was removed (100% indicates cured adhesive bonded to color layer). The results of cross-hatch adhesion testing of the fully cured protective coatings are also shown. An uncured adhesive that did not completely remove from the glass substrate when used in an adhesive tape, may be successfully used in an adhesive label. Such adhesive labels are cut to the dimensions of the color layer so that the adhesive layer does not contact the underlying glass substrate of the color filter.

In one embodiment of the present invention, the adhesive tape or label comprises a radiation curable adhesive layer having an upper surface and a lower surface and a transparent carrier layer having an upper surface and a lower surface, wherein the lower surface of the transparent carrier layer overlies the upper surface of the adhesive layer; wherein the adhesive layer comprises an adhesive having an uncured state, a radiation cured state and a baked state. In the uncured state, the adhesive has a storage sheer modulus at 0.01 rad/sec frequency of between $2 \times 10^3$ and $2 \times 10^4$ Pascals; a loss shear modulus at 0.01 rad/sec frequency of between $3.5 \times 10^2$ and $3.5 \times 10^3$ Pascals; a storage shear modulus at 100 rad/sec frequency of between $2.5 \times 10^4$ and $2.5 \times 10^5$ Pascals and a loss shear modulus at 100 rad/sec frequency of between $2.5 \times 10^4$ and $2.5 \times 10^5$ Pascals. The adhesive removes cleanly from the glass substrate of the color filter. In the radiation cured state, the adhesive has a storage sheer at 0.01 rad/sec frequency of between $4 \times 10^4$ and $4 \times 10^5$ Pascals; a loss shear modulus at 0.01 rad/sec frequency of between $4.0 \times 10^3$ and $4.0 \times 10^4$ Pascals; a storage shear modulus at 100 rad/sec frequency of between $2.0 \times 10^5$ and $2.0 \times 10^6$ Pascals and a loss shear modulus at 100 rad/sec frequency of between $1.5 \times 10^5$ and $1.5 \times ^6$ Pascals. The adhesive completely transfers to the color layer of the color filter upon exposure to radiation. In the baked state the adhesive has a storage sheer at 0.01 rad/sec frequency of greater than $2.5 \times 10^4$ Pascals; a loss shear modulus at 0.01 rad/sec frequency of greater than $3.0 \times 10^3$ Pascals; a storage shear modulus at 100 rad/sec frequency of greater than $3.0 \times 10^3$ Pascals and a loss shear modulus at 100 rad/sec frequency of less than $3.0 \times 10^5$ Pascals. The adhesive, following baking at 240° C. for about 1 hour, passes the cross-hatch adhesion test. FIG. 5 shows the viscoelastic window of this embodiment of the adhesive of the present invention.

TABLE 4

| Example | Adhesive 1 | Adhesive 2 | Adhesive 3 | Adhesive 4 |
|---|---|---|---|---|
| Removal from glass substrate | 100% | 0 | 0 | 100% |
| Transfer to color layer | 100 | 100 | 100 | 0 |
| Cross hatch adhesion | Pass | Pass | Pass | NA |

In order for the color filter to have excellent display quality, the protective coating of the present invention should be optically clear. A protective coating made from the adhesive of Example 1 was evaluated for optical clarity using a Byk Gardner Haze-Gard Plus HP-4725. The percentage light transmission was measured for a protective coating, having a thickness of 20 microns, under conditions similar to those encountered during the different stages of manufacturing the protective coating. The clarity of the protective coating was compared to a glass sample. The percentage light transmission results are shown in Table 5 below.

TABLE 5

| Sample | Glass | Adhesive 1 |
|---|---|---|
| Dried at 70↑C | 89.2 | 90.1 |
| UV treated | 89.1 | 90.0 |
| Baked at 240↑C/1 hr. | 85.0 | 86.5 |

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A method of manufacturing a protective coating on a color filter, said color filter comprising a transparent substrate, a colored layer having an upper and lower surface, said lower surface of said colored layer overlying said transparent substrate; which comprises the steps of:

a. adhering an adhesive article to said color filter, wherein said adhesive article comprises (i) a radiation curable adhesive layer having an upper surface and a lower surface, said adhesive layer comprising an acrylic pressure sensitive adhesive;

(ii) a transparent carrier layer, having an upper surface and a lower surface, wherein the lower surface of said transparent carrier layer overlies and is adhered to the upper surface of said adhesive layer;

so that the lower surface of said adhesive layer is adhered to said upper surface of said colored layer;

b. positioning a photomask over said adhesive article;

c. exposing said adhesive article to radiation through said photomask to cure portions of said adhesive layer and leaving portions of said adhesive layer uncured;

d. removing said carrier layer with said uncured portions of said adhesive layer adhered thereto to form a multilayer structure comprising a transparent substrate, a colored layer and a protective coating overlying said colored layer, wherein said protective coating comprises the radiation cured portions of the adhesive layer; and e. baking said multilayer structure to fully cure said protective coating.

2. The method of claim 1 wherein said adhesive article further comprises a radiation curable epoxy layer between said radiation curable adhesive layer and said transparent carrier layer, and wherein said epoxy layer is cured by said radiation exposure and wherein said protective coating comprises the cured adhesive layer and the cured epoxy layer.

3. The method of claim 1 wherein said adhesive layer comprises an acrylic pressure sensitive adhesive and an acrylated urethane oligomer.

4. The method of claim 3 wherein said acrylated urethane oligomer comprises the reaction product of an acrylate ester containing an active hydrogen atom in the alcoholic moiety of the ester and and organic polyisocyanate.

5. The method of claim 1 wherein said acrylic pressure sensitive adhesive comprises an acrylic copolymer of a glycidyl acrylic monomer.

6. The method of claim 5 wherein said acrylic pressure sensitive adhesive comprises, on a copolymerized basis, from about 55% to about 85% by weight of a monomer selected from the group consisting of alkyl acrylate esters and alkyl methacrylate esters containing from 4 to about 12 carbon atoms in the alkyl group, from about 0.1% to about 2% by weight of glycidyl monomer, about 0% to about 20% by weight of an N-vinyl lactam monomer, from about 0 to about 15% by weight of an ethylenically unsaturated carboxylic acid, and from 0 to about 35% by weight of an alkyl acrylate or methacrylate ester containing less than 4 carbon atoms in the alkyl group.

7. A method of manufacturing a protective coating on a color filter, said color filter comprising a transparent substrate, a colored layer having an upper and lower surface, said lower surface of said colored layer overlying said transparent substrate; which comprises the steps of:

(a) adhering an adhesive article to said color filter, wherein said adhesive article comprises (i) a radiation curable adhesive layer having an upper surface and a lower surface, said adhesive layer comprising a crosslinkable acrylic pressure sensitive adhesive;

(ii) a transparent carrier layer, having an upper surface and a lower surface, wherein the lower surface of said transparent carrier layer overlies the upper surface of said adhesive layer and; and (iii) a radiation curable epoxy layer between said radiation curable adhesive layer and said transparent carrier layer;

so that the lower surface of said adhesive layer is adhered to said upper surface of said colored layer;

b. curing said adhesive layer and said epoxy layer by exposing said adhesive layer and said epoxy layer to radiation;

c. removing said carrier layer to form a multilayer structure comprising a transparent substrate, a colored layer and a protective coating overlying said colored layer, wherein said protective coating comprises the cured adhesive layer and cured epoxy layer.

8. A method of manufacturing a protective coating on a color filter, said color filter comprising a transparent substrate, a colored layer having an upper an lower surface, said lower surface of said colored layer overlying said transparent substrate; which comprises the steps of a. adhering an adhesive article to said color filter, wherein said adhesive article comprises (i) a radiation curable adhesive layer having an upper surface and a lower surface, said adhesive layer comprising a crosslinkable acrylic pressure sensitive adhesive and an acrylated urethane oligomer; and (ii) a transparent carrier layer, having an upper surface and a lower surface, wherein the lower surface of said transparent carrier layer overlies the upper surface of said adhesive layer;

so that the lower surface of said adhesive layer is adhered to said upper surface of said colored layer;

b. curing said adhesive layer by exposing said adhesive layer to radiation;

c. removing said carrier layer to form a multilayer structure comprising a transparent substrate, a colored layer and a protective coating overlying said colored layer, wherein said protective coating comprises the cured adhesive layer.

9. The method of claim 8 wherein said acrylated urethane oligomer comprises the reaction product of an acrylate ester containing an active hydrogen atom in the alcoholic moiety of the ester and an organic polyisocyanate.

10. A method of manufacturing a protective coating on a color filter, said color filter comprising a transparent substrate, a colored layer having an upper and lower surface, said lower surface of said colored layer overlying said transparent substrate; which comprises the steps of:

a. adhering an adhesive article to said color filter, wherein said adhesive article comprises (i) a curable adhesive layer having an upper surface and a lower surface, said adhesive layer comprising a crosslinkable acrylic pressure sensitive adhesive comprising on a copolymerized basis, from about 55% to about 85% by weight of a monomer selected from the group consisting of alkyl acrylate esters and alkyl methacrylate esters containing from 4 to about 12 carbon atoms in the alkyl group, from about 0.1% to about 2% by weight of glycidyl monomer, about 0% to about 20% by weight of an N-vinyl lactam monomer, from about 0 to about 15% by weight of an ethylenically unsaturated carboxylic acid, and from 0 to about 35% by weight of an alkyl acrylate or methacrylate ester containing less than 4 carbon atoms in the alkyl group; and (ii) a transparent carrier layer, having an upper surface and a lower surface, wherein the lower surface of said transparent carrier layer overlies the upper surface of said adhesive layer;

so that the lower surface of said adhesive layer is adhered to said upper surface of said colored layer;

b. curing said adhesive layer;

c. removing said carrier layer to form a multilayer structure comprising a transparent substrate, a colored layer and a protective coating overlying said colored layer, wherein said protective coating comprises the cured adhesive layer.

11. A method of manufacturing a protective coating on a color filter, said color filter comprising a transparent substrate, a colored layer having an upper and lower surface, said lower surface of said colored layer overlying said transparent substrate; which comprises the steps of:

a. adhering an adhesive article to said color filter, wherein said adhesive article comprises (i) an anaerobic curable adhesive layer having an upper surface and a lower surface, said adhesive layer comprising a crosslinkable acrylic pressure sensitive adhesive; and (ii) a transparent carrier layer, having an upper surface and a lower surface, wherein the lower surface of said transparent carrier layer overlies the upper surface of said adhesive layer;

so that the lower surface of said adhesive layer is adhered to said upper surface of said colored layer;

b. curing said adhesive layer;

c. removing said carrier layer to form a multilayer structure comprising a transparent substrate, a colored layer and a protective coating overlying said colored layer, wherein said protective coating comprises the cured adhesive layer.

\* \* \* \* \*